United States Patent
Maki et al.

(10) Patent No.: US 7,841,455 B2
(45) Date of Patent: Nov. 30, 2010

(54) HYDRAULIC CONTROL SYSTEM FOR AUTOMATIC TRANSMISSION

(75) Inventors: Yoshinori Maki, Anjo (JP); Hitoshi Asano, Anjo (JP); Masatake Ichikawa, Anjo (JP); Hiroshi Tsutsui, Nishio (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 796 days.

(21) Appl. No.: 11/693,342

(22) Filed: Mar. 29, 2007

(65) Prior Publication Data
US 2008/0032861 A1    Feb. 7, 2008

(30) Foreign Application Priority Data
Mar. 31, 2006    (JP) ............... 2006-099837

(51) Int. Cl.
*B60W 10/02* (2006.01)
(52) U.S. Cl. ..................................... 192/3.58
(58) Field of Classification Search ........... 192/87.11, 192/87.13, 109 F, 3.58; 477/155
See application file for complete search history.

(56) References Cited

U.S. PATENT DOCUMENTS

| | | | |
|---|---|---|---|
| 5,397,284 A | 3/1995 | Matsumoto et al. | |
| 5,782,711 A | 7/1998 | Tsutsui et al. | |
| 6,259,983 B1 | 7/2001 | Tsutsui et al. | |
| 6,503,165 B1 * | 1/2003 | Kubo et al. | 475/125 |
| 2002/0142886 A1 | 10/2002 | Kubo et al. | |

FOREIGN PATENT DOCUMENTS

| JP | 4-244663 A | 9/1992 |
|---|---|---|
| JP | 6-81944 A | 3/1994 |
| JP | 9-170654 A | 6/1997 |
| JP | 11-336887 A | 12/1999 |
| JP | 2000-266173 A | 9/2000 |
| JP | 2001-124195 A | 5/2001 |
| JP | 2002-295663 A | 10/2002 |

* cited by examiner

*Primary Examiner*—David D Le
*Assistant Examiner*—Derek D Knight
(74) *Attorney, Agent, or Firm*—Sughrue Mion, PLLC

(57) ABSTRACT

In clutch-to-clutch upshifting, the occurrence of inertia shock is suppressed while racing of the engine is prevented. Corresponding to a first sweep control in which an engaging-side pressure sweeps up toward a target hydraulic pressure $P_{T4}$, a releasing-side hydraulic pressure $P_B$ sweeps down as an initial control. When the releasing-side hydraulic pressure $P_B$ becomes a minute torque capacity $[fP_B(0)+P_{KEEP}+P_{LS2T}]$, a hold control, which has a very low gradient $\delta P_B$, is started so that the pressure is substantially held, and, after a rotation change is started, the pressure sweeps down with a low gradient $\delta P_{E2}$ until release.

10 Claims, 8 Drawing Sheets

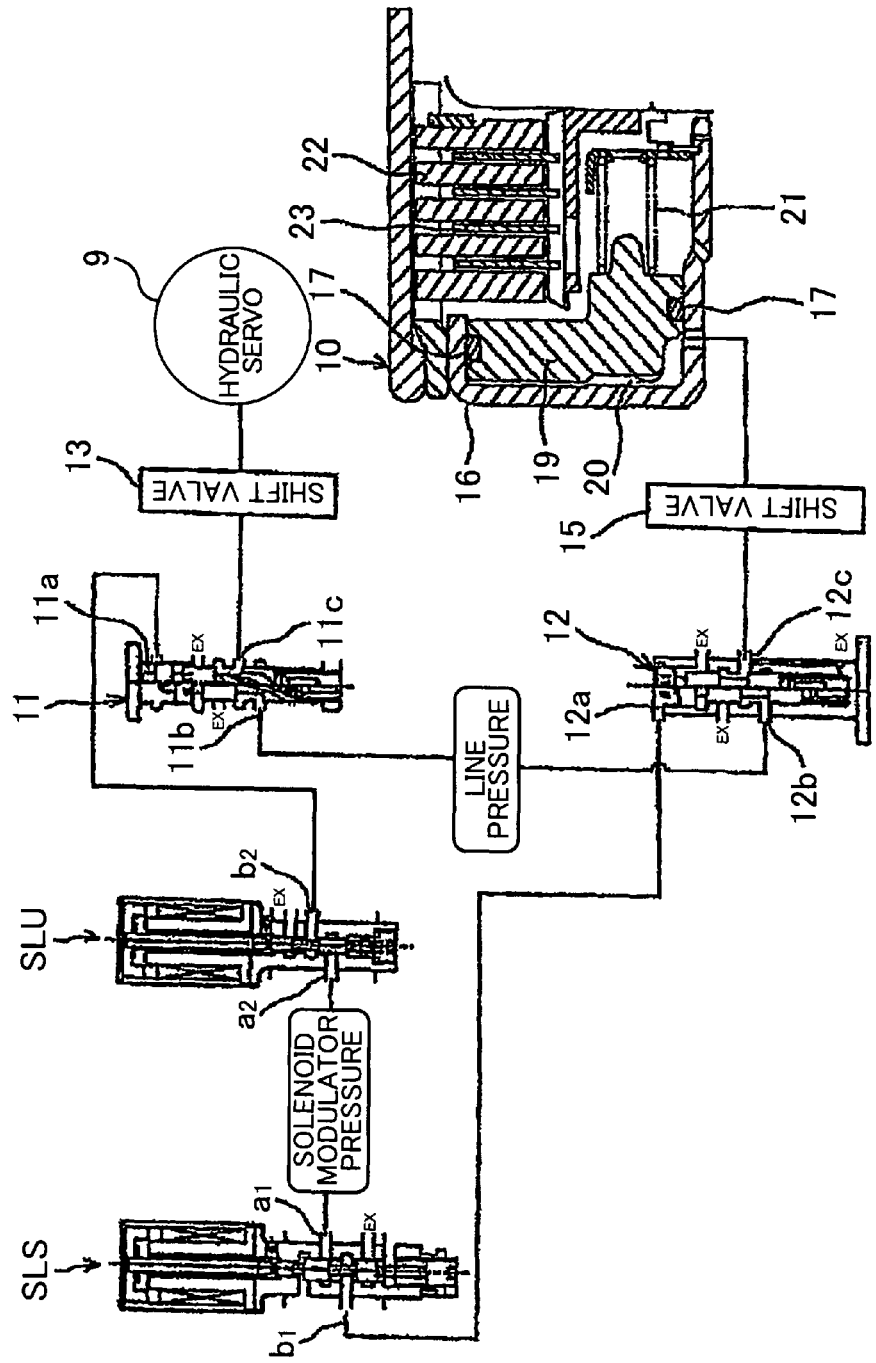

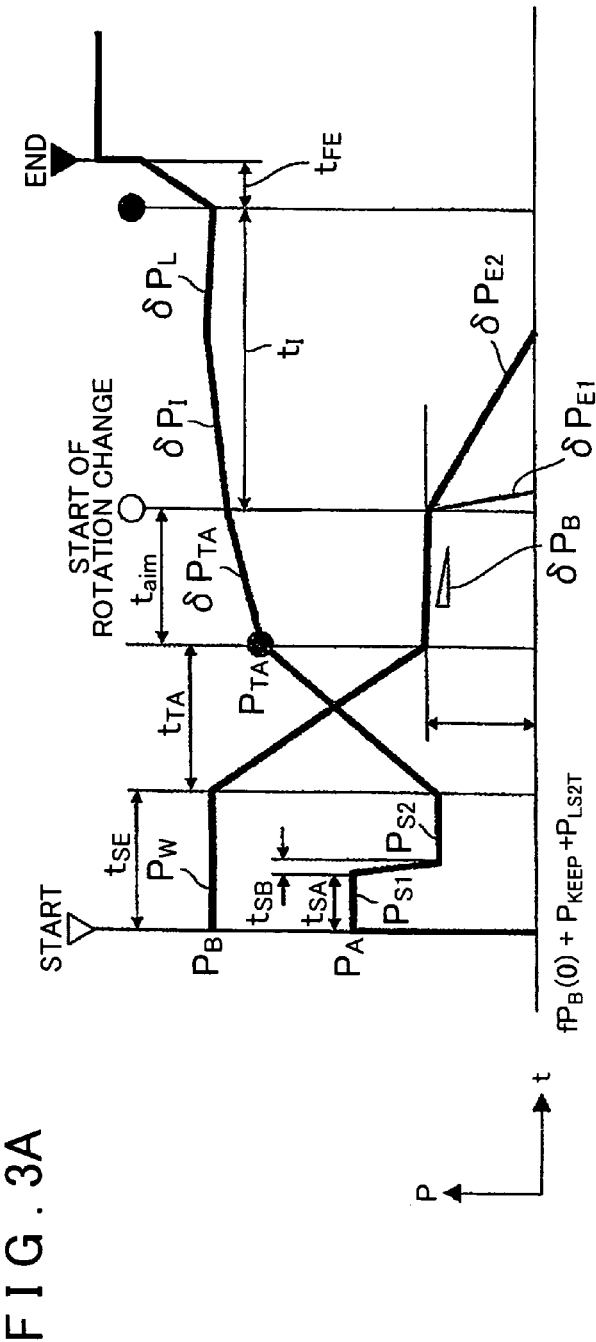
F I G. 3A
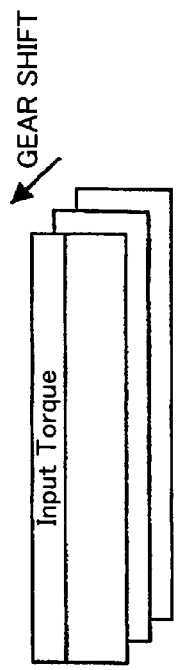
F I G. 3B
$P_{KEEP}$: CORRECTION TERM FOR TARGET HOLDING PRESSURE

HYDRAULIC CONTROL SYSTEM FOR AUTOMATIC TRANSMISSION

CROSS-REFERENCE TO RELATED PATENT APPLICATIONS

This application claims priority from Japanese Patent Application No. 2006-099837, filed on Mar. 31, 2006, in the Japanese Patent Office, the disclosure of which is incorporated herein in its entirety by reference.

TECHNICAL FIELD

Apparatuses consistent with the present invention relate to a hydraulic control unit for an automatic transmission mounted in an automobile, and more particularly, to a hydraulic control unit in a so-called clutch-to-clutch (clutch switching) shift, for example, in a clutch-to-clutch upshift, in which a shift to a predetermined shift speed is accomplished by engaging one friction engagement element and releasing another friction engagement element.

BACKGROUND ART

Generally, in an automatic transmission, shifting to a shift speed is commanded according to a vehicle speed and a throttle opening, and, to achieve the commanded shift speed, a transmission path of a speed change mechanism is changed by a clutch-to-clutch shift.

As a hydraulic control unit for the above-mentioned clutch-to-clutch shift, one example is disclosed in Japanese Patent No. 3331844. FIG. 7 shows a change of hydraulic pressure during an upshift by the hydraulic control unit. In FIG. 7, $P_A$ is a hydraulic pressure command value for a (first) friction engagement element on an engaging side (hereinafter called "engaging-side hydraulic pressure"), and $P_B$ is a hydraulic pressure command value for a (second) friction engagement element on a releasing side (hereinafter called "releasing-side hydraulic pressure"), and both of them are output from a control unit to a linear solenoid valve, which is a pressure regulating means. Note that the symbols are the same as those used in FIG. 3A describing an exemplary embodiment of the present invention, and the details are described later with reference to FIG. 3A.

After a servo start control by which a piston is stroked to close a backlash of the first friction engagement element, the engaging-side hydraulic pressure $P_A$ is increased depending on an input torque, by a first sweep control in which the pressure sweeps with a predetermined gradient toward a target hydraulic pressure $P_{TA}$ immediately before an inertia phase starts, and by a second sweep control in which the pressure sweeps from the target hydraulic pressure with a gradient $\delta P_{TA}$ lower than the predetermined gradient (torque phase control). When an input rotational speed is changed by the pressure increase, an inertia control starts, and the pressure sweeps up while being controlled by feedback of the amount of change in the input rotational speed and increases with a high gradient near the completion of the shift (completion control), and thus the gear shift is completed.

On the other hand, the releasing-side hydraulic pressure $P_B$ is calculated by a function of the engaging-side hydraulic pressure $P_A$ and the input torque, and is swept down depending on the increase of the engaging-side hydraulic pressure $P_A$. Therefore, after the servo start control, the pressure sweeps down with a predetermined gradient corresponding to the first sweep control toward the target hydraulic pressure $P_{TA}$ for the engaging-side hydraulic pressure $P_A$, and, corresponding to the second sweep control after the target hydraulic pressure $P_{TA}$, sweeps down with a gradient $\delta P_C$ lower than the above-mentioned predetermined gradient. When the inertia control starts, the pressure sweeps down with a comparatively high gradient $\delta P_{E1}$, and the releasing-side hydraulic pressure $P_B$ becomes zero.

SUMMARY OF THE INVENTION

Because the above-mentioned releasing-side hydraulic pressure $P_B$ is swept down with the predetermined gradient $\delta P_C$ depending on the second sweep control of the engaging-side hydraulic pressure to prevent an engine racing, usually the releasing-side hydraulic pressure $P_B$ has substantially been released when the input rotational speed has changed. Therefore, because only the engaging-side hydraulic pressure $P_A$ produces the rotation change, if the gradient of the engaging-side hydraulic pressure is made high to reduce the time of the torque phase, an output shaft torque $T_O$ can change greatly and generate an inertia shock immediately after the inertia phase has started, as shown in FIG. 8.

An exemplary embodiment of the present invention aims to provide a hydraulic control unit for an automatic transmission that prevents the occurrence of an inertial shock while preventing engine racing, by partly changing a control of a releasing-side hydraulic pressure control means corresponding to the above-mentioned second sweep control.

According to an aspect of an exemplary embodiment of the present invention, a hydraulic control unit for an automatic transmission includes: a plurality of friction engagement elements that switch power transmission paths between an input shaft and an output shaft, the plurality of friction engagement elements include a first friction engagement element and a second friction engagement element, a hydraulic servo that engages and disengages the friction engagement elements; the second friction engagement element being released at the same time as the first friction engagement element is engaged so as to accomplish an upshift to a predetermined shift speed; hydraulic control means that controls hydraulic pressure of at least each hydraulic servo (9, 10) for the first friction engagement element and the second friction engagement element; and a control unit (1) that receives signals from each sensor (2 to 8) based on vehicle driving condition and outputs a hydraulic pressure control signal to the hydraulic control means (SLU, SLS). The control unit (1) includes an engaging-side hydraulic control means (1a) that calculates a change in hydraulic pressure to the hydraulic servo (9) for the first friction engagement element and outputs the change to the hydraulic control means (SLU), and a releasing-side hydraulic control means (1b) that calculates hydraulic pressure to the hydraulic servo (10) for the second friction engagement element and outputs the pressure to the hydraulic control means (SLS). The releasing-side hydraulic control means (1b) includes an initial control (B) that involves sweeping down in a torque phase to a predetermined releasing-side hydraulic pressure $(P_B \leq fP_B(0) + P_{KEEP} + P_{LS2T})$ that is calculated depending on an engaging-side hydraulic pressure $(P_A)$ by the engaging-side hydraulic control means (1a) and at which the second friction engagement element has a minute torque capacity, and a hold control (C) that controls to substantially hold the predetermined releasing-side hydraulic pressure after the initial control and until a start of an inertia phase following the torque phase is detected.

Accordingly, since the releasing-side control means provides the hold control substantially holding the predetermined releasing hydraulic pressure at which the second friction engagement element has a minute torque capacity subsequent to the initial control calculated depending on an engaging-side hydraulic pressure, variation in an output shaft torque at the start of the inertia phase can be reduced without increasing time of the torque phase compared to changing an input shaft rotational speed in the inertia phase, only with the engaging-side hydraulic pressure. In addition, this structure can prevent an engine racing until rotation change in the input rotational speed is detected and prepare for the following final control.

According to an aspect of the present invention, the predetermined releasing-side hydraulic pressure of the hydraulic control unit for an automatic transmission is added by a correction term ($P_{KEEP}$) based on a map depending on a torque range and set.

Accordingly, since the releasing-side hydraulic pressure properly corresponding to a torque range is held, the time until the start of rotation change can be set almost constant irrespective of the torque, thereby preventing lowering of shift feeling.

The hold control (C) of the hydraulic control unit for an automatic transmission may involve sweeping down with a very low gradient ($\delta P_B$).

Accordingly, since the hold control involves sweeping down with a very low gradient even if there is a variation in the releasing-side hydraulic pressure, an excessive time lag until the start of rotation change can be prevented, and an excessive tie-up can be prevented in the following final control.

The releasing-side hydraulic control means (1b) in the hydraulic control unit for an automatic transmission according to an exemplary embodiment may include low-gradient sweep-down control subsequent to the hold control (C) (that is, the final control D). The low-gradient sweep-down control involves sweeping down with a low gradient ($\delta P_{E2}$) that makes the releasing-side hydraulic pressure ($P_B$) zero before the inertia phase control of the engaging-side hydraulic control means (1a) is completed.

Accordingly, since the releasing-side hydraulic pressure is released by sweeping down with a low-gradient as rotation change in the input rotational speed is detected after the hold control, controllability of the engaging-side hydraulic pressure in the inertia phase can be prevented from lowering.

According to an aspect of the present invention, the releasing-side hydraulic control means (1b) in the hydraulic control unit for an automatic transmission may include, subsequent to the hold control (C), high-gradient sweep-down control involving sweeping down with a higher gradient ($\delta P_{E1}$) than the low gradient ($\delta P_{E2}$) for the low-gradient sweep-down control, and may select one of the low-gradient sweep-down control and the high-gradient sweep-down control.

Accordingly, the final control in releasing-side hydraulic control can be selected between the low-gradient sweep-down control and the high-gradient sweep-down control in accordance with vehicle types, shift speeds, and the driver's preference, for example.

According to a further aspect of an exemplary embodiment of the present invention, the automatic transmission for which the hydraulic control unit for an automatic transmission is used is provided with an automatic shift mode and a manual shift mode. In the automatic shift mode the low-gradient ($\delta P_{E2}$) sweep-down control is selected, and in the manual shift mode the high-gradient ($\delta P_{E1}$) sweep-down control is selected.

Accordingly, the low-gradient sweep-down control is selected in the automatic shift mode to prevent an occurrence of inertia shock and achieve a comfortable and smooth shift feeling, while the high-gradient sweep-down control is selected in the manual shift mode to achieve a sporty shift feeling.

According to a further exemplary aspect of the present invention, in the hydraulic control unit for an automatic transmission, the engaging-side hydraulic control means (1a) may include a first sweep control involving sweeping up with a first gradient toward a target hydraulic pressure ($P_{TA}$) immediately before the inertia phase starts, and a second sweep control involving sweeping up with a second gradient lower than the first gradient until rotation change in an input rotational speed is detected ($P_{TA}$) ($\Delta N \geq dN_S$) from the target hydraulic pressure. The initial control (B) of the releasing-side hydraulic control means is calculated depending on an engaging-side hydraulic pressure of the first sweep control.

Accordingly, since the releasing-side hydraulic control means includes the first sweep control and the second sweep control in the torque phase control and the releasing-side hydraulic pressure of the releasing-side hydraulic control means in the initial control is calculated depending on an engaging-side hydraulic pressure of the first sweep control, a smooth torque change can be achieved at a gear shift. At the same time, the following hold control and final control of the releasing-side control means can prevent an engine racing and the occurrence of an inertial shock.

Note that the numerals in the parentheses are used only for allowing an exemplary, non-limiting reference to the drawings, and are not intended to limit the claims in any manner.

BRIEF DESCRIPTION OF THE DRAWINGS

FIG. 2 is a schematic drawing of a hydraulic circuit applicable to an exemplary embodiment of the present invention.

FIG. 3A is a time chart about hydraulic pressure commands in gear upshifting according to an exemplary embodiment of the present invention, and FIG. 3B is a mapping chart of its correction term for target holding pressure.

DETAILED DESCRIPTION OF EXEMPLARY, NON-LIMITING EMBODIMENTS

An automatic transmission has a number of friction engagement elements such as clutches and brakes, and is provided with an automatic shift mechanism (not shown) with which a transmission path of a planetary gear is selected by engaging and disengaging these friction engagement elements as necessary, and an input shaft of the automatic shift mechanism is connected to an engine output shaft via a torque converter, and an output shaft of the mechanism is connected to drive wheels.

Figure 1:
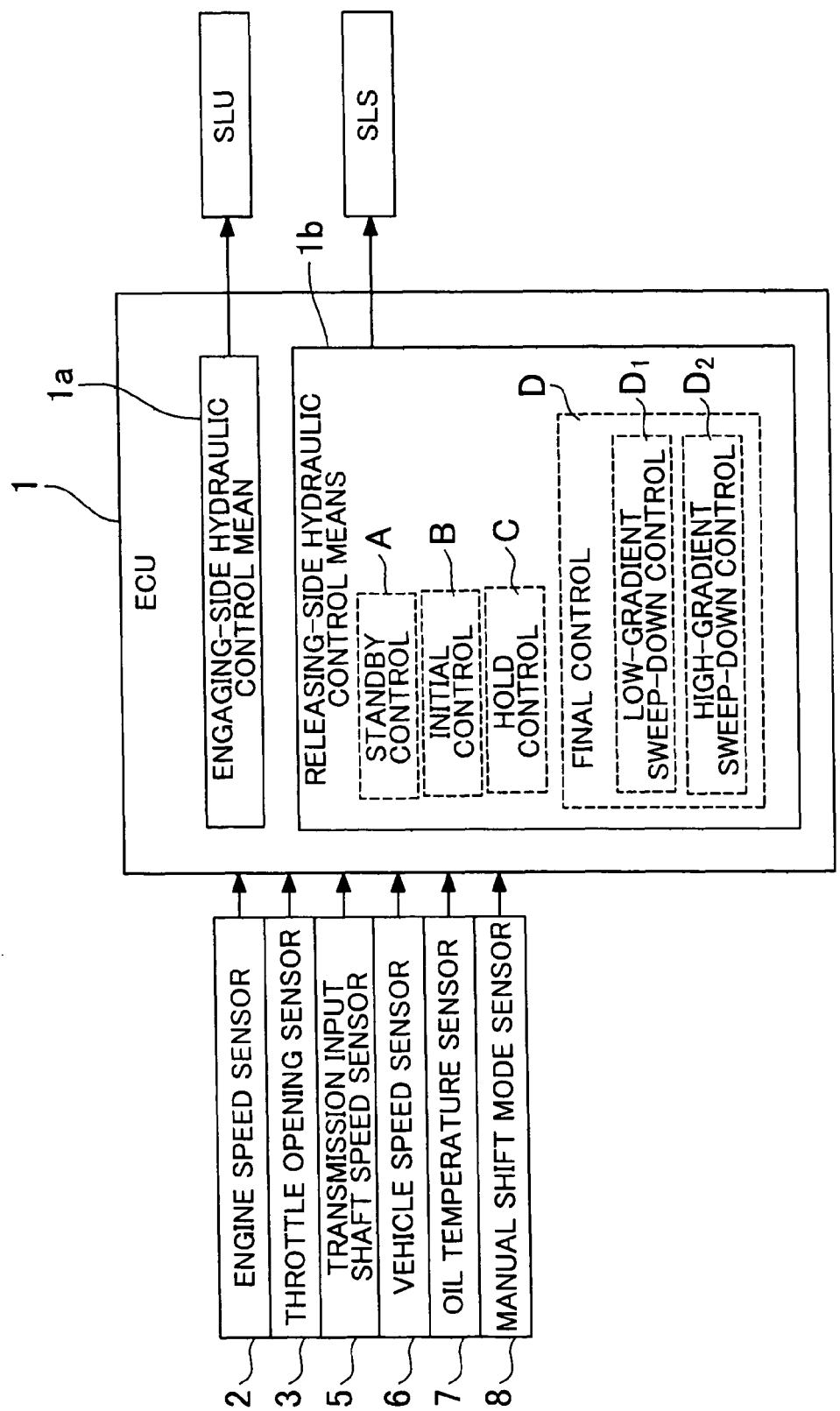
FIG. 1 is an electric control block diagram according to an exemplary embodiment of the present invention.

FIG. 1 is a block diagram showing an electric system control including a control unit 1 comprising a microcomputer that receives signals from an engine speed sensor 2, a throttle opening sensor 3, a transmission (automatic transmission) input shaft speed (=turbine speed) sensor 5, a vehicle speed (=automatic transmission output shaft speed) sensor 6, and an oil temperature sensor 7, and outputs signals to linear solenoid valves (hydraulic control means) SLS, SLU of a hydraulic circuit. It can be applied to an automatic transmission that allows manual shifting, in which case the control unit 1 receives a signal from an manual shift mode sensor (detecting means) 8 which detects that the driver has selected the manual shift mode. The control unit 1 has engaging-side hydraulic control means 1*a* that calculates the change in hydraulic pressure to a hydraulic servo (for example, 9 in FIG. 2 described later) for the first friction engagement element and outputs the result to the above-mentioned linear solenoid valve (hydraulic control means) SLU, and it also has a releasing-side hydraulic control means 1*b* that calculates the change in hydraulic pressure to a hydraulic servo (for example, 10 in FIG. 2 described later) for the second friction engagement element and outputs the result to the above-mentioned linear solenoid valve (hydraulic control means) SLS. The releasing-side hydraulic control means 1*b* is provided with: a standby control A which stands by holding a releasing-side hydraulic pressure at an engaging pressure in response to the servo start control of the engaging-side hydraulic control means 1*a*; an initial control B which sweeps down the pressure in a torque phase to a predetermined releasing-side hydraulic pressure which is calculated depending on the engaging-side hydraulic pressure by the engaging-side hydraulic control means 1*a* and at which the second friction engagement element has a minute torque capacity; a hold control C which controls to substantially hold the predetermined releasing-side hydraulic pressure after the initial control and until a start of an inertia phase next to the torque phase is detected; and a final control D which can be selected as a low-gradient sweep-down control $D_1$ or a high-gradient sweep-down control $D_2$.

FIG. 2 is a schematic drawing of a hydraulic circuit. The hydraulic circuit has the two linear solenoid valves SLS and SLU, and has multiple hydraulic servos 9, 10 which switch transmission paths of planetary gear units of the automatic shift mechanism, and engage and disengage multiple friction engagement elements (clutches and brakes) achieving a shift speed of, for example, the fourth or fifth forward gear, or the first reverse gear. In addition, a solenoid modulator pressure is provided to intake ports $a_1$, $a_2$ of the linear solenoid valves SLS, SLU, and control pressures from output ports $b_1$, $b_2$ of these linear solenoid valves are provided to control oil chambers 11*a*, 12*a* of pressure control valves 11, 12, respectively. Line pressures of the pressure control valves 11, 12 are provided to intake ports 11*b*, 12*b*, respectively, and pressures from output ports 11*c*, 12*c* regulated at the control pressures are provided to the hydraulic servos 9, 10 via shift valves 13, 15, respectively, as necessary.

This hydraulic circuit shows a basic concept, and the hydraulic servos 9, 10 and the shift valves 13, 15 are symbolic representations, and in actuality, a number of hydraulic servos are provided corresponding to the automatic shift mechanism, and also a number of shift valves to switch pressures to these hydraulic servos are provided. In addition, as shown in the hydraulic servo 10, the hydraulic servo has a piston 19 fitting oil tightly to a cylinder 16 with an oil seal 17, and by the regulated pressure from the pressure control valve 12 acting on a pressure chamber 20, the piston 19 travels against a return spring 21 and contacts an outer friction plate 22 and an inner friction material 23. Although the friction plates and friction material are shown as used in a clutch, they naturally correspond to a brake in a similar manner.

Figure 4:
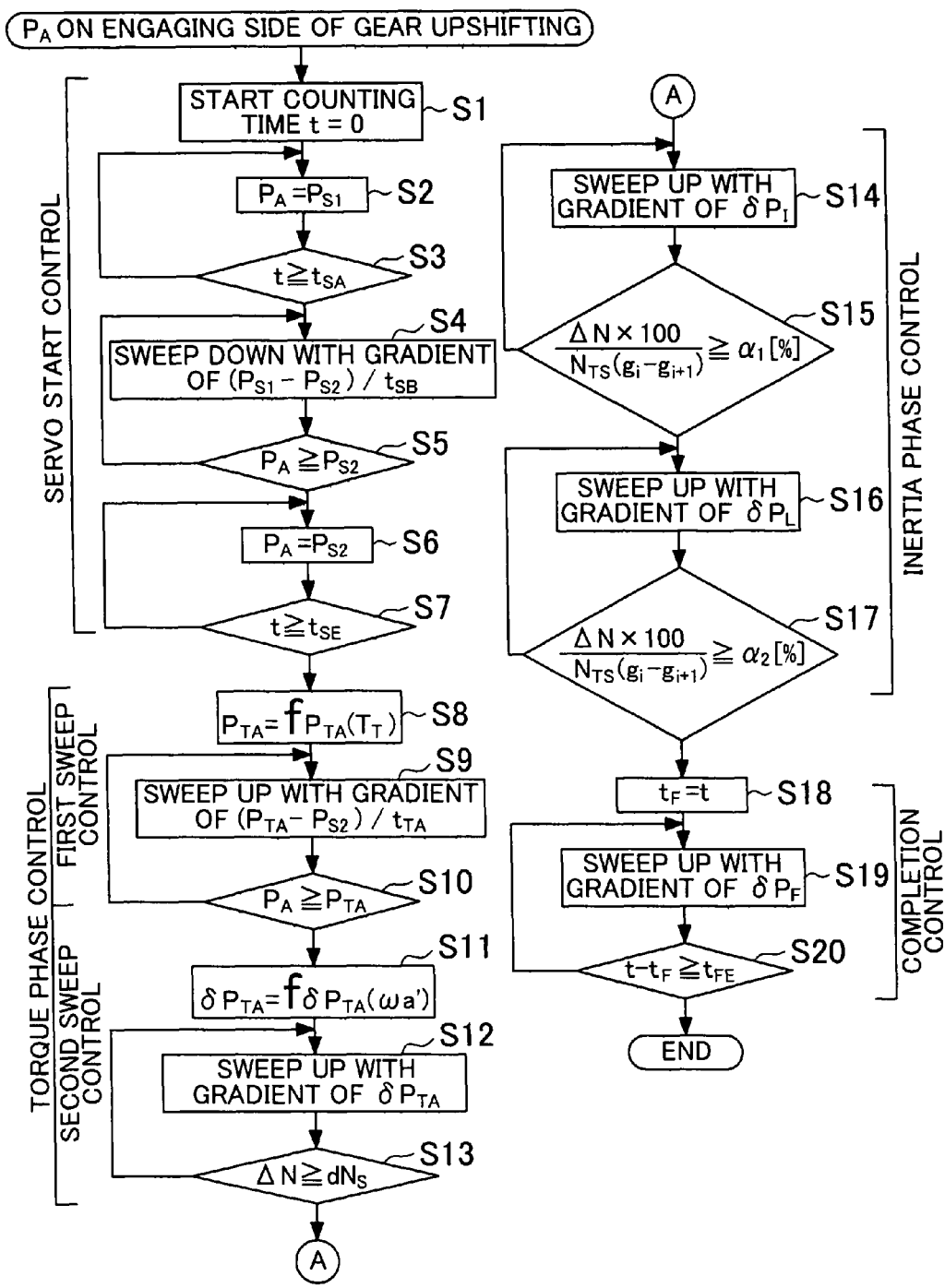
FIG. 4 is a flowchart showing a control of an engaging-side hydraulic pressure in gear upshifting according to an exemplary embodiment of the present invention.

Next, referring to FIG. 3 and FIG. 4, an engaging-side control (engaging-side hydraulic control means 1*a*) in gear upshifting is described.

First, when the control unit 1 outputs an upshift signal based on signals from the throttle opening sensor 3 and the vehicle speed sensor 6 (START), time counting starts (S1). Then, a predetermined signal is output to the linear solenoid valve SLU (or SLS) so that a hydraulic pressure command value for the engaging-side hydraulic servo (engaging-side hydraulic pressure) $P_A$ becomes a predetermined pressure $P_{S1}$ (S2). The predetermined pressure $P_{S1}$ is set to a pressure required to fill up the pressure chamber 20 of the hydraulic servo and held for a predetermined time $t_{SA}$. After the predetermined time $t_{SA}$ has passed (S3), the engaging-side hydraulic pressure $P_A$ sweeps down with a predetermined gradient $[(P_{S1}-P_{S2})/t_{SB}]$ (S4), and, when the engaging-side hydraulic pressure $P_A$ becomes a predetermined low pressure $P_{S2}$ (S5), the sweep-down is stopped, and the pressure is held at the predetermined low pressure $P_{S2}$ (S6). The predetermined low pressure $P_{S2}$ is set at a pressure that is large enough to move the piston and small enough to avoid a rotation change of the input shaft, and it is held until the time count t becomes a predetermined time $t_{SE}$ (S7). The above-mentioned steps S1 to S7 are the servo start control.

Then, based on a predefined function $[P_{TA}=f_{PTA}(T_T)]$ that changes in response to an input torque $T_T$, a target engaging-side hydraulic pressure $P_{TA}$ is calculated immediately before an input shaft rotational speed $N_T$ starts to change (immediately before the start of the inertia phase) (S8). To calculate the engaging-side hydraulic pressure $P_{TA}$ immediately before the start of the inertia phase, first a torque $T_A$ allotted to the engaging side (=$1/a \cdot T_T$, where a: torque allotment ratio) corresponding to the input torque $T_T$ is calculated, and then the target hydraulic pressure $P_{TA}$ is calculated using the formula $P_{TA}=(T_A/A_A)+B_A+dP_{TA}$ [where $B_A$: piston moving pressure (=spring load), $A_A$: effective radius of friction plate×piston area×number of friction plates×coefficient of friction, $dP_{TA}$: delayed pressure rise]. Then, based on the engaging-side hydraulic pressure $P_{TA}$ calculated corresponding to the input torque $T_T$ immediately before the start of the inertia phase, the predefined gradient $[(P_{TA}-P_{S2})/t_{TA}]$ is calculated from a preset time $t_{TA}$, and the engaging-side hydraulic pressure is swept up with the gradient (S9). The engagement torque is increased by the first sweep-up with a comparatively moderate gradient, and the hydraulic pressure increases to a level immediately before the input rotational speed starts to change, in other words, to the predetermined target engaging-side hydraulic pressure $P_{TA}$ (S10). This is a state before an upshift and in a torque phase in which an output shaft torque temporarily drops rapidly. The above-mentioned steps S8 to S10 are the first sweep control in the torque phase control.

To obtain the input torque $T_T$ (=turbine torque), an engine torque is obtained by linear interpolation using a map of throttle opening and engine speed based on vehicle driving condition, and then a speed ratio is calculated from input and output speeds of a torque converter, and a torque ratio is calculated from the speed ratio using a map, and finally the input torque $T_T$ is obtained multiplying the engine torque by the torque ratio.

When the above-mentioned target engaging-side hydraulic pressure $P_{TA}$ is reached, in other words, when the inertia phase, in which the input shaft rotational speed $N_T$ starts to change, is predicted to be entered, a change $\delta P_{TA}$ of the pressure is calculated by a function $[\delta P_{TA}=f\delta P_{TA}(\omega a')]$ depending on a target rotational speed change ratio ($d\omega a/dt$, denoted as $\omega a'$), which is a target of the input shaft rotational speed $N_T$ at the start of rotation change (S11). In other words, assuming that k is a constant, $t_{aim}$ is a target shift start time, ωa' is a target rotational speed change ratio [ωa: gradient toward a target rotational speed], and I is an inertia, the pressure change is calculated as $\delta P_{TA}=[I\cdot\omega a]/[k\cdot t_{aim}]$. Further, it is swept up with a gradient of the pressure change $\delta P_{TA}$ (S12). The second sweep-up is continued until a rotational speed change ΔN from an input shaft speed $N_{TS}$ at the start of rotation change reaches a predetermined shift start judgment speed $dN_S$ (S13). The above-mentioned steps S11 to S13 are the second sweep control in the torque phase control.

Note that the above-mentioned target shift start time $t_{aim}$ is set as a function of the input shaft rotational speed $N_T$. In addition, the shift start judgment speed $dN_S$ is a minimum rotational speed at which a rotational speed change can actually be detected, and it depends on the detection accuracy of the input shaft speed sensor 5. Because of a low detection accuracy at a low speed, the rotational speed for detection must be high, and thus the shift start judgment speed $dN_S$ becomes high, resulting in an increase of the target shift start time $t_{aim}$.

After that, when the start of the inertia phase is detected by detecting the rotational speed change ΔN of the input rotational speed, an engaging-side hydraulic pressure change $\delta P_I$ is feedback-controlled and set using the rotational speed change ΔN based on the detection by the input shaft speed sensor 5, and a sweep-up starts with a gradient of the $\delta P_I$ (S14). The sweep-up with a gradient of the $\delta P_I$ is continued until $\alpha_1$ [%], for example, 70 [%] of the rotational speed change ΔN up to the shift completion is reached (S15). In other words, assuming that $N_{TS}$ is the input shaft speed at the start of shifting, ΔN is the rotational speed change, $g_i$ is a gear ratio before shifting, and $g_{i+1}$ is a gear ratio after shifting, it is continued until $[(\Delta N \times 100)/N_{TS}(g_i-g_{i+1})]$ reaches $\alpha_1$ [%].

Further, when the $\alpha_1$ [%] of the rotational speed change is exceeded, a different pressure change $\delta P_L$ is set by feedback control based on a smooth input shaft speed change ΔN, and a sweep-up starts with a gradient of the $\delta P_L$ (S16). The $\delta P_L$ generally gives a slightly lower gradient than $\delta P_I$, and the sweep-up is continued until $\alpha_2$ [%], for example, 90 [%] of the rotational speed change close to the shift completion is reached (S17). A map of throttle opening and vehicle speed is selected from multiple maps different by oil temperature, and, based on the map, a sweep-up target shift time $t_1$ by the $\delta P_I$ and the $\delta P_L$ is set. The above-mentioned steps S14 to S17 are the inertia phase control.

Then, after the target shift time $t_1$ has passed, the time count $t_F$ is set (S18), and this status roughly corresponds to the end of inertia phase. In addition, a comparatively quick pressure change $\delta P_F$ is set, and the pressure rapidly sweeps up with that pressure change (S19), and when a predetermined time $t_{FE}$, which is long enough to raise the pressure to an engaging pressure, has passed from the time count $t_F$ (S20), the engaging-side hydraulic control is completed. The above-mentioned steps S18 to S20 are the completion control.

Figure 5:
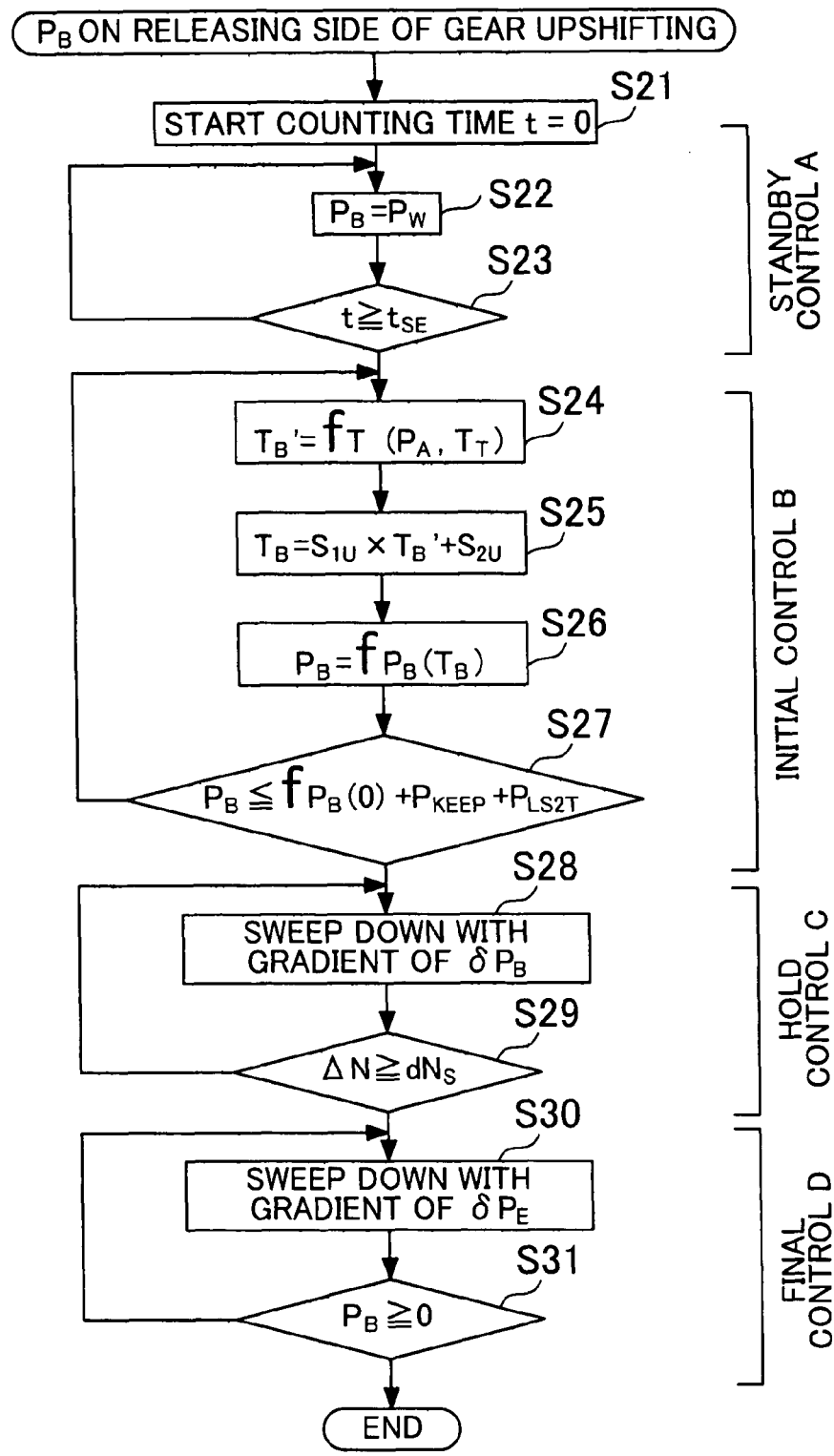
FIG. 5 is a flowchart showing a control of a releasing-side hydraulic pressure in gear upshifting according to an exemplary embodiment of the present invention.

Next, referring to FIG. 3 and FIG. 5, a releasing-side control (releasing-side hydraulic control means 1b) in the gear upshifting is described.

First, by a shift command from the control unit 1, time counting in a releasing-side hydraulic pressure control is started at the same time as the engaging-side hydraulic pressure control (S21), and as a releasing-side hydraulic pressure $P_B$, a high pressure $P_W$ derived from the engaging pressure is provided (S22). The provision of the high pressure $P_W$ is maintained until the engaging-side hydraulic pressure $P_A$ starts the first sweep-up ($t_{SE}$) (S23). The above-mentioned steps S21 to S23 are the standby control A, which corresponds to the servo start control of the engaging-side control.

Then, a releasing-side torque $T_B'$ is calculated by a function of the engaging-side hydraulic pressure $P_A$ and the input torque $T_T[T_B'=f_{TB}(P_A, T_T)]$ (S24), and, additionally taking into account margins $S_{IU}$, $S_{2U}$ ($T_B=S_{IU}\times T_B'+S_{2U}$), a releasing-side torque $T_B$ is calculated (S25). Then, the releasing-side hydraulic pressure $P_B$ is calculated from the releasing-side torque $T_B$ [$P_B=f_{PB}(T_B)$] (S26). In other words, the torque $T_A$ allotted to the engaging-side friction engagement element is first calculated by [$T_A=A_A+P_A+B_A$] ($A_A$: effective radius×piston area×number of plates×coefficient of friction, $B_B$: piston moving pressure), and, through this, the torque $T_B'$ allotted to the releasing-side friction engagement element is calculated by [$T_B'=(1/b)T_T-(a/b)T_A$]. Note that b is a torque allotted to the releasing side, a is a torque allotted to the engaging side, and $T_T$ is the input shaft torque. Then, by the margins (degrees of tie-up) $S_{IU}$ and $S_{2U}$, the degrees of tie-up with the engaging-side friction engagement element are set taking into account the driver feeling, and the releasing-side torque $T_B$ is calculated by [$T_B=S_{IU}\times T_B'+S_{2U}$]. The margins $S_{IU}$ and $S_{2U}$ are discretionally set to suit the driver feeling using a map of throttle opening and vehicle speed selected from a number of maps depending on oil temperature, and generally $S_{IU}>1.0$ and $S_{2U}>0.0$. Further, from the releasing-side torque $T_B$ taking into account the margins, the releasing-side hydraulic pressure $P_B$ is calculated by [$P_B=(T_B/A_B)+B_B$] ($A_B$: effective radius of releasing-side friction engagement element×piston=area×number of plates×coefficient of friction, $B_B$: releasing-side piston moving pressure).

Figure 7:
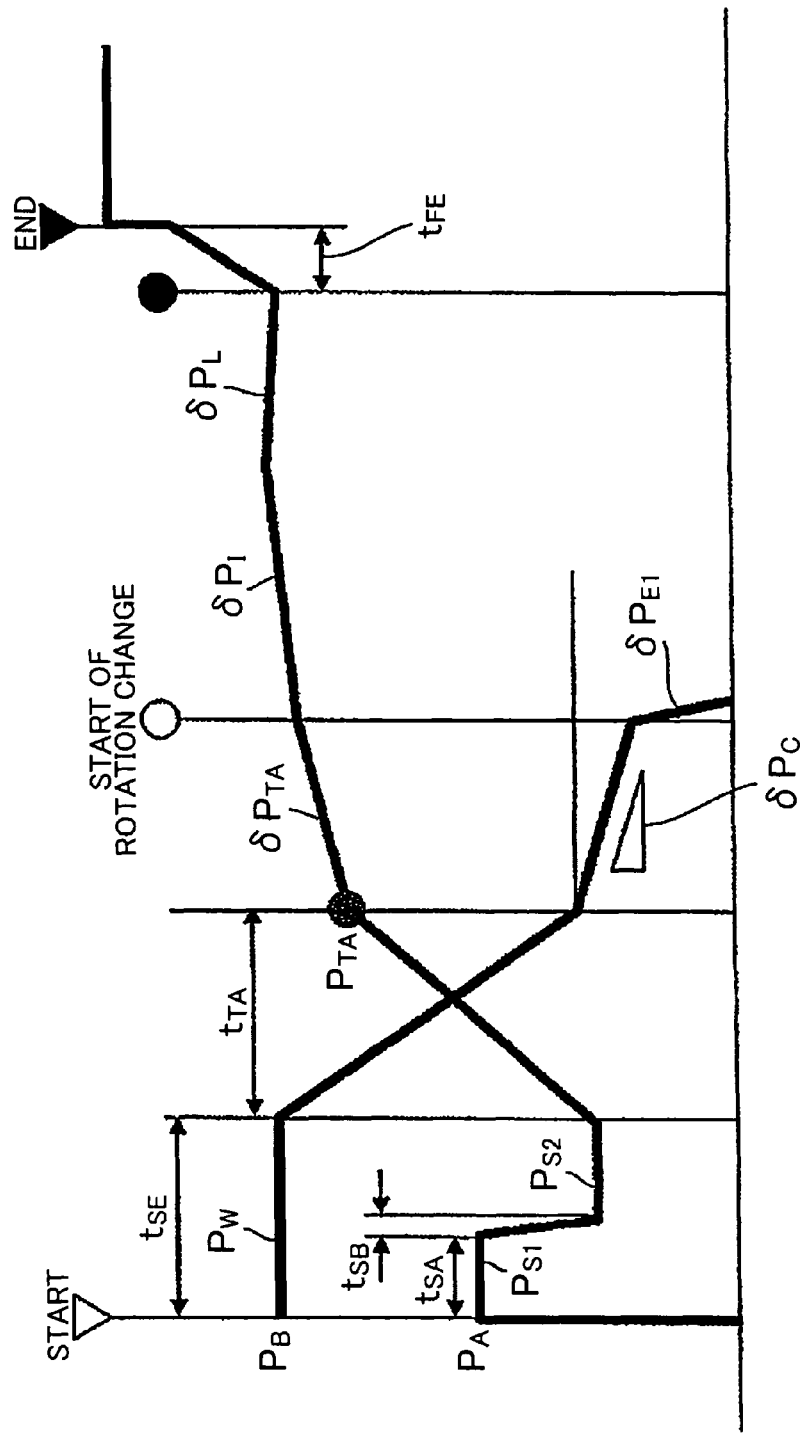
FIG. 7 is a time chart about hydraulic pressure commands in gear upshifting by a related art.

In the related-art hydraulic control shown in FIG. 7, because the sweep-down by the releasing-side hydraulic pressure $P_B$ depends on the engaging-side hydraulic pressure $P_A$, it consists of two gradients bending at the torque phase in which the transmission output shaft torque drops; in other words, it consists of a comparatively steep sweep-down corresponding to the first engaging-side sweep control and a comparatively moderate sweep-down corresponding to the second engaging-side sweep control. In an exemplary embodiment of the present invention, the sweep-down corresponding to the above-mentioned second sweep control is maintained so that a predetermined pressure is almost held constant. In other words, the sweep-down of the releasing-side hydraulic pressure $P_B$ represented by the formula used in S26 is performed with a gradient corresponding to the first sweep control of the engaging-side hydraulic pressure $P_A$, and the sweep-down is continued until the releasing-side hydraulic pressure $P_B$ reaches [$P_B \geq fP_B(0)+P_{KEEP}\ P_{LS2T}$] (S27). The above-mentioned steps S24 to S27 are the initial control B, which corresponds to the first sweep control of the engaging-side control.

The releasing-side hydraulic pressure $P_B$ is composed of the sum of the pressure [$fP_B(0)$] with which the torque ($T_B$) allotted to the releasing-side is a minute torque, the correction term [$P_{KEEP}$] for target holding pressure which is selected from a map, and the pressure [$P_{LS2T}$] which is set by the learning control shown, for example, in Japanese Patent Application Publication No. JP-A-11-63202, and it is composed of a value with which the releasing-side (second) friction engagement element holds a minute torque capacity. Note that, in FIG. 3A, the above-mentioned pressure [$fP_B(0)+P_{KEEP}+P_{LS2T}$] is set at the releasing-side hydraulic pressure corresponding to the target engaging-side hydraulic pressure $P_{TA}$ for the engaging-side hydraulic pressure $P_A$, and therefore it coincides with the time $t_{TA}$ at which the engaging-side hydraulic pressure becomes the target pressure $P_{TA}$, but it needs not necessarily coincide.

The above-mentioned [$P_{LS2T}$] is a value that is corrected at the next shifting by learning control, and also it is a value that is corrected as necessary depending on the acceleration (rate of rotation change, angular acceleration) of the input shaft rotational speed $N_T$ and the time (time lag) until the input shaft rotational speed $N_T$ starts to change. For example, it is judged as follows.

If engine racing occurs, and the time until the racing is not long, and the start of the change of the input shaft rotational speed $N_T$ is not late, the releasing-side hydraulic pressure is judged to be too low, and $[P_{LS2T}]$ is increased at the next shifting.

If engine torque is low, and the start of the change of the input shaft rotational speed $N_T$ is late, and the acceleration at the start of the change of the input shaft rotational speed $N_T$ is large, the releasing-side hydraulic pressure is judged to be too high, and $[P_{LS2T}]$ is reduced at the next shifting.

The above-mentioned correction term $P_{KEEP}$ for target holding pressure is selected using maps as shown in FIG. 3B, and it is discretionally set so that the releasing-side friction engagement element can hold a minute torque capacity at a number of input torque values selected in each shift speed, and so that the driver feeling is satisfied. In the low torque range, because torque input is comparatively low, the releasing-side hydraulic pressure $P_B$ depending on the above-mentioned engaging-side hydraulic pressure should only be output at a comparatively low value, and therefore, the above-mentioned correction term $P_{KEEP}$ for holding pressure is set to a small negative value or zero to prevent an excessive time lag until the start of rotation change by tie-up. In the medium torque range, because the above-mentioned releasing-side hydraulic pressure $P_B$ is output at a comparatively high value, the margin of the releasing-side friction engagement element against the minute torque capacity is slightly larger than that of low torque, and therefore, the above-mentioned correction term $P_{KEEP}$ for holding pressure is set to approximately zero.

For the high torque range, there are the following two ideas, and either of them is chosen. One idea is that, in the high torque range, in consideration of the thermal load to the engaging-side friction engagement element by an excessive time lag until the start of rotation change, holding of the releasing-side hydraulic pressure $P_B$ is avoided as much as possible, and, according to this idea, the above-mentioned correction term $P_{KEEP}$ for holding pressure is set to a negative value. The second idea is for the case in which the engaging-side friction engagement element has a sufficient margin against thermal load, and, by this idea, the above-mentioned correction term $P_{KEEP}$ for holding pressure is set at approximately zero to hold the releasing-side hydraulic pressure $P_B$ even in the high torque range, and, by this, the releasing side holds a minute torque capacity to reduce an inertia shock.

When the releasing-side hydraulic pressure $P_B$ becomes lower than the pressure set in S27, it sweeps down with a preset gradient $\delta P_B$ (S28). The gradient $\delta P_B$ is set at a very small value, including zero, with which the releasing-side hydraulic pressure $P_B$ substantially set in the above-mentioned S27 is held until the rotation change of the input rotational speed $N_T$ substantially starts (start of the inertia phase: $\Delta N \geq dN_S$). Although the above-mentioned gradient $\delta P_B$ may be zero, when taking into account the variation in the releasing-side hydraulic pressure, it is practically desirable to set the gradient at a very slow sweep down to prevent an excessive time lag until the start of rotation change, due to the variation. By setting the releasing-side hydraulic pressure $P_B$ that has been set in the above-mentioned S27 at a minute torque capacity, and by sweeping down the pressure with a very low gradient $\delta P_B$, the excessive time lag until the start of rotation change can be prevented while preventing an engine racing with a tendency of slight tie-up. The above-mentioned steps S28 and S29 are the hold control B, which corresponds to the second sweep control of the engaging-side control. The above-mentioned steps S24 to S29 (initial control B+hold control C) correspond to the torque phase control of the engaging-side control.

Then, the very slow sweep-down is continued, similar to that of the engaging side, until the input shaft speed change $\Delta N$ becomes the predetermined rotation change start judgment speed $dN_S$ (detection of the start of the inertia phase) (S29). After that, a releasing pressure change $\delta P_E$ is set, and a sweep-down is started with a gradient of the pressure change (S30), and the sweep-down is continued until the releasing-side hydraulic pressure $P_B$ becomes zero (S31), and, by this, the releasing-side hydraulic pressure control is completed. The above-mentioned steps S30 and S31 are the final control D, which includes low-gradient sweep-down control and high-gradient sweep-down control, as described further below.

The gradient $\delta P_E$ in the above-mentioned S30 is selected from two gradients. The high-gradient $\delta P_{E1}$, which is the same as the related-art type shown in FIG. 7, produces a quick shift preventing a tie-up, and is selected in the manual shift mode in this exemplary embodiment of the present invention. The low-gradient $\delta P_{E2}$, which is a lower gradient than that of the related-art type, is set so that the releasing-side hydraulic pressure $P_B$ becomes zero (S31) before S17 of the engaging-side hydraulic pressure control, or the inertia phase control, is completed (before the completion control starts).

The automatic transmission of this exemplary embodiment of the invention is provided with a manual shift mode, which enables manual selection of shift speeds, in addition to an automatic shift mode, and is normally set at the low-gradient $\delta P_{E2}$, and is set to the above-mentioned high-gradient $\delta P_{E1}$, based on a signal from the manual shift mode detecting means 8 (see FIG. 1), which detects that the manual shift mode is selected. By this, a smooth and comfortable shift feeling is obtained in the automatic shift mode, and a sporty shift feeling is obtained in the manual shift mode.

Figure 6:
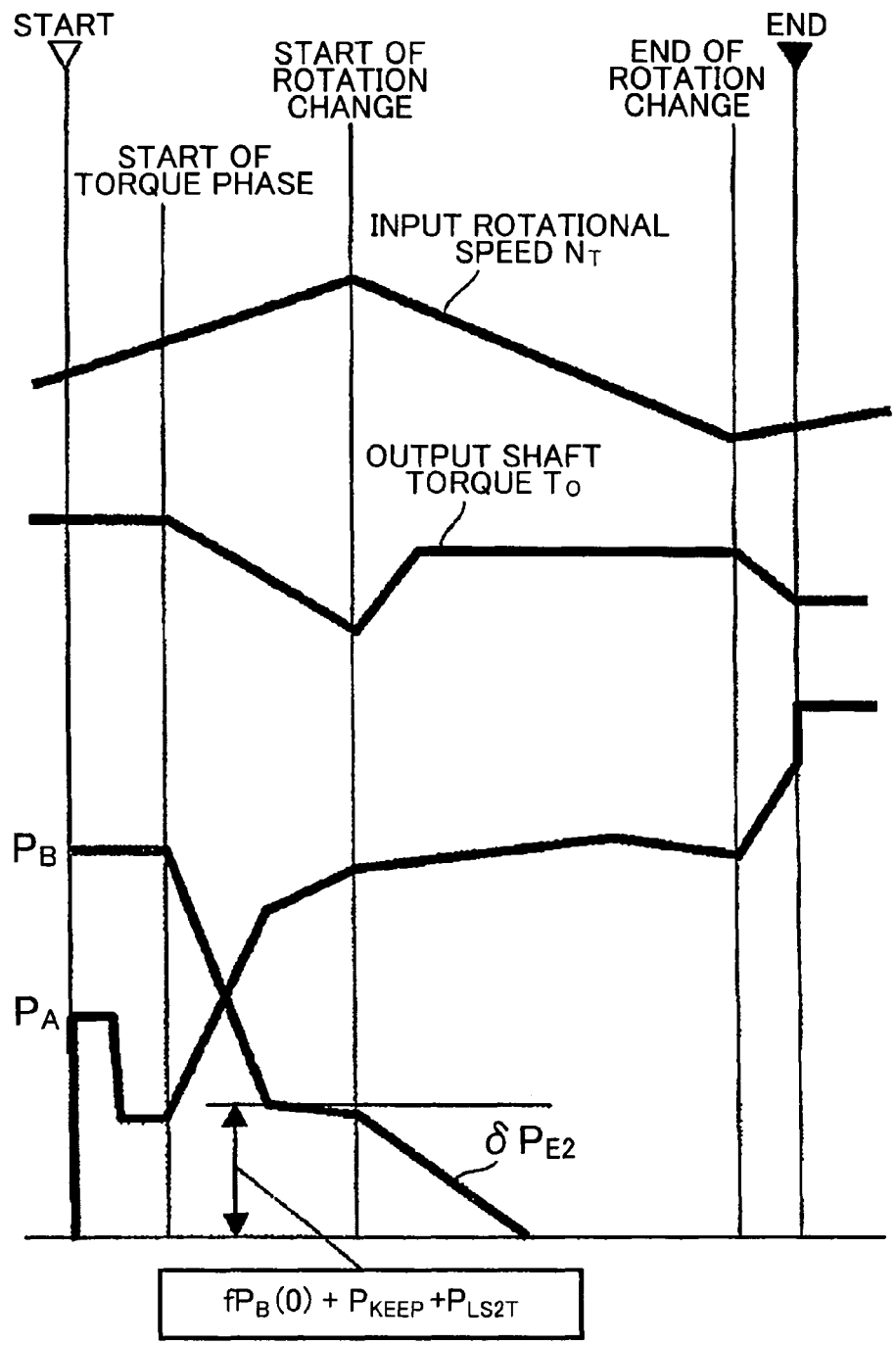
FIG. 6 is a time chart according to an exemplary embodiment of the present invention.
Figure 8:
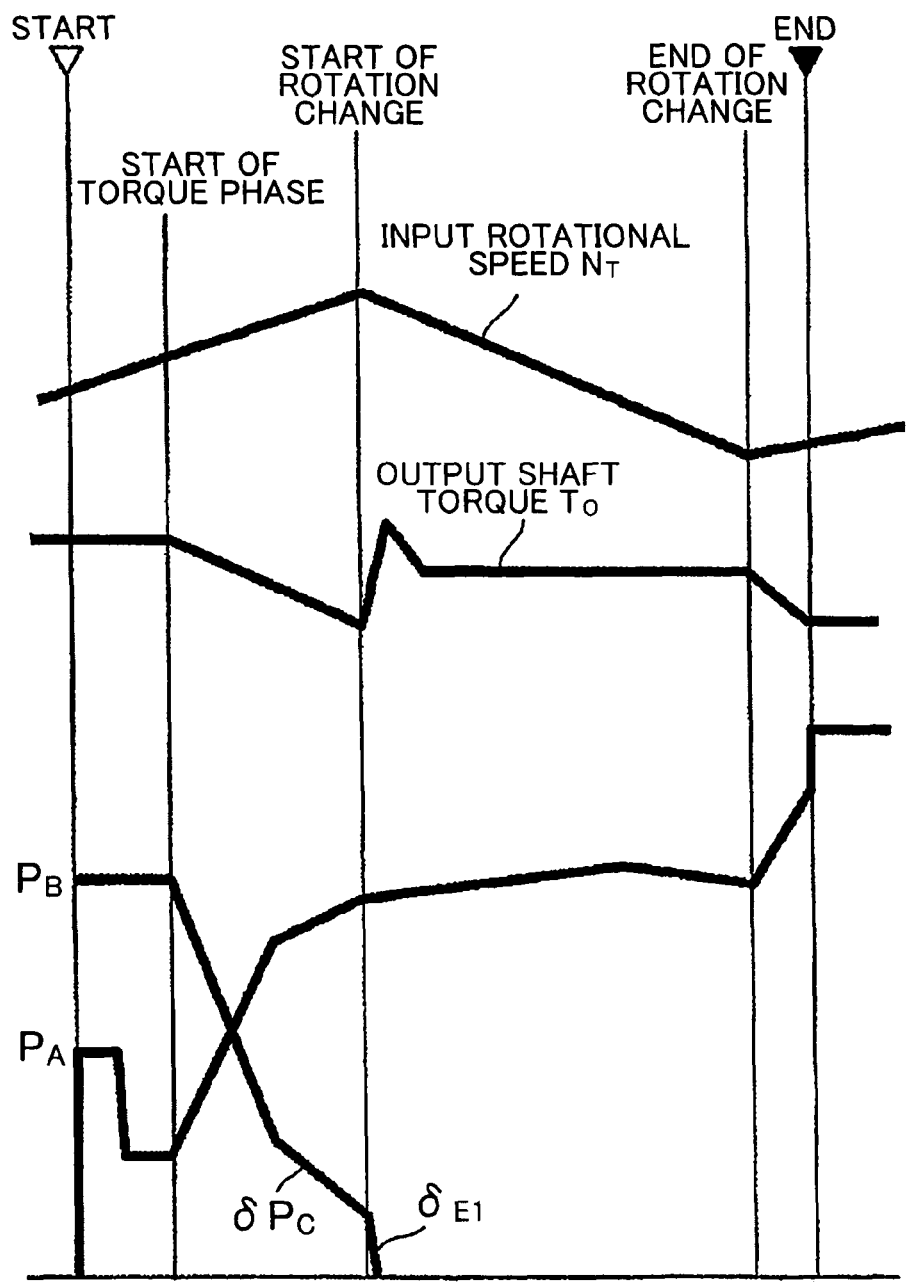
FIG. 8 is a time chart according to a related art.

Normally (in the automatic shift mode), the low-gradient $\delta P_{E2}$ is selected, and, in combination with the pressure holding a minute torque capacity in S27 and S29, a rapid change of the output torque $T_O$ (see FIG. 8) is eliminated, and an occurrence of inertia shock is prevented, as shown in FIG. 6. By adoption of the low-gradient $\delta P_{E2}$ in S30, tie-up is considered to occur, but excessive tie-up does not occur because, in S27, the releasing-side hydraulic pressure $P_B(=fP_B(0)+P_{KEEP} P_{LS2T})$ is set at a pressure level that can hold a minute torque holding capacity, and also S29 is a very slow sweep-down, and the releasing-side hydraulic pressure has become equal to or lower than a predetermined pressure level that can hold the minute torque capacity when rotation change starts.

Exemplary embodiments of the present invention may be applied to an automatic transmission that is mounted in an automobile and shifts gears through switching of power transmission paths composed of a number of gears by engaging or disengaging clutches or brakes (friction engagement elements), and is used as a hydraulic control unit which controls the above friction engagement elements. This hydraulic control unit is used for a so-called clutch-to-clutch (clutch switching) shift, in which a shift to a predetermined shift speed is accomplished by engaging one friction engagement element and releasing another friction engagement element, and is especially suitable for use in a clutch-to-clutch upshift.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

The invention claimed is:

1. A hydraulic control unit for an automatic transmission, comprising:
a plurality of friction engagement elements that switch power transmission paths between an input shaft and an output shaft, the plurality of friction engagement elements comprise a first friction engagement element and a second friction engagement element, the second friction engagement element being released at the same time as the first friction engagement element is engaged so as to accomplish an upshift to a predetermined shift speed;
hydraulic servos that engage and disengage the friction engagement elements;
hydraulic control means that controls hydraulic pressure of the hydraulic servos for the first friction engagement element and the second friction engagement element;
at least one sensor for outputting signals representing a vehicle drive condition; and a control unit that receives signals from each sensor based on the vehicle driving condition and outputs a hydraulic pressure control signal to the hydraulic control means, wherein, the control unit comprises engaging-side hydraulic control means that calculates a change in hydraulic pressure to the hydraulic servo for the first friction engagement element and outputs the hydraulic pressure to the hydraulic control means, and releasing-side hydraulic control means that calculates a change in hydraulic pressure to the hydraulic servo for the second friction engagement element and outputs the hydraulic pressure to the hydraulic control means; and
the releasing-side hydraulic control means comprises an initial control that involves sweeping down in a torque phase to a predetermined releasing-side hydraulic pressure that is calculated depending on an engaging-side hydraulic pressure by the engaging-side hydraulic control means and at which the second friction engagement element has a minute torque capacity, and a hold control that controls to substantially hold the predetermined releasing-side hydraulic pressure after the initial control and until a start of an inertia phase following the torque phase is detected,
wherein the engaging-side hydraulic control means comprises a first sweep control involving sweeping up with a first gradient toward a target hydraulic pressure immediately before the inertia phase starts, and a second sweep control involving sweeping up with a second gradient lower than the first gradient until rotation change in an input rotational speed is detected from the target hydraulic pressure, and
wherein the initial control of the releasing-side hydraulic control means is calculated depending on an engaging-side hydraulic pressure of the first sweep control.

2. The hydraulic control unit for an automatic transmission according to claim 1, wherein the predetermined releasing-side hydraulic pressure is added by a correction term based on a map depending on a torque range and set.

3. The hydraulic control unit for an automatic transmission according to claim 2, wherein the releasing-side hydraulic control means further comprises, subsequent to the hold control, low-gradient sweep-down control involving sweeping down with a low gradient that makes the releasing-side hydraulic pressure zero before the inertia phase control of the engaging-side hydraulic control means is completed.

4. The hydraulic control unit for an automatic transmission according to claim 3, wherein the releasing-side hydraulic control means further comprises, subsequent to the hold control, high-gradient sweep-down control involving sweeping down with a higher gradient than the low gradient for the low-gradient sweep-down control, and selects one of the low-gradient sweep-down control and the high-gradient sweep-down control.

5. The hydraulic control unit for an automatic transmission according to claim 4, wherein the automatic transmission is provided with an automatic shift mode and a manual shift mode,
in the automatic shift mode the low-gradient sweep-down control being selected, and
in the manual shift mode the high-gradient sweep-down control being selected.

6. The hydraulic control unit for an automatic transmission according to claim 1, wherein the releasing-side hydraulic control means further comprises, subsequent to the hold control, low-gradient sweep-down control involving sweeping down with a low gradient that makes the releasing-side hydraulic pressure zero before the inertia phase control of the engaging-side hydraulic control means is completed.

7. The hydraulic control unit for an automatic transmission according to claim 6, wherein the releasing-side hydraulic control means further comprises, subsequent to the hold control, high-gradient sweep-down control involving sweeping down with a higher gradient than the low gradient for the low-gradient sweep-down control, and selects one of the low-gradient sweep-down control and the high-gradient sweep-down control.

8. The hydraulic control unit for an automatic transmission according to claim 7, wherein the automatic transmission is provided with an automatic shift mode and a manual shift mode,
in the automatic shift mode the low-gradient sweep-down control being selected, and
in the manual shift mode the high-gradient sweep-down control being selected.

9. The hydraulic control unit for an automatic transmission according to claim 1, wherein the releasing-side hydraulic control means further comprises, subsequent to the hold control, high-gradient sweep-down control involving sweeping down with a higher gradient than the low gradient for the low-gradient sweep-down control, and selects one of the low-gradient sweep-down control and the high-gradient sweep-down control.

10. The hydraulic control unit for an automatic transmission according to claim 9, wherein the automatic transmission is provided with an automatic shift mode and a manual shift mode,
in the automatic shift mode the low-gradient sweep-down control being selected, and
in the manual shift mode the high-gradient sweep-down control being selected.

* * * * *